(12) United States Patent
Buck et al.

(10) Patent No.: US 7,503,483 B2
(45) Date of Patent: Mar. 17, 2009

(54) SUBSTANTIALLY PLANAR DISCONTINUOUS BUSINESS COMMUNICATION ASSEMBLY HAVING LASER ABRADED RECESSED AREAS

(75) Inventors: Roger D. Buck, Pittsburg, KS (US); James L. Lowry, Fort Scott, KS (US)

(73) Assignee: Ward/Kraft, Fort Scott, KS (US)

( * ) Notice: Subject to any disclaimer, the term of this patent is extended or adjusted under 35 U.S.C. 154(b) by 643 days.

(21) Appl. No.: 11/177,704

(22) Filed: Jul. 8, 2005

(65) Prior Publication Data

US 2007/0007356 A1    Jan. 11, 2007

(51) Int. Cl.
*G06K 5/00* (2006.01)

(52) U.S. Cl. .................. 235/380; 235/375; 235/488; 235/487; 283/61

(58) Field of Classification Search ............... 235/380, 235/488, 487, 492, 445, 375; 283/61, 62
See application file for complete search history.

(56) References Cited

U.S. PATENT DOCUMENTS

| | | | |
|---|---|---|---|
| 4,447,481 A | 5/1984 | Holmberg et al. | |
| 4,618,520 A | 10/1986 | Holmberg | |
| 5,403,236 A | 4/1995 | Greig | |
| 5,557,096 A * | 9/1996 | Watanabe et al. | 235/492 |
| 5,769,457 A * | 6/1998 | Warther | 283/61 |
| 5,842,722 A * | 12/1998 | Carlson | 283/107 |
| 6,439,613 B2 * | 8/2002 | Klure | 283/62 |
| 2003/0025322 A1 * | 2/2003 | Casper | 283/101 |

* cited by examiner

*Primary Examiner*—Edwyn Labaze
(74) *Attorney, Agent, or Firm*—Harry Weissenberger

(57) ABSTRACT

The present invention relates to a discontinuous business form construction created preferably from differential substrates that have been provided with one or more removable elements such as cards, labels, tags and differential substrates. The form construction is desirably a composite form having at least first and second discrete portions or segments one of which carries one or more removable elements and the other of which provides an information carrying portion. The form construction of the present invention is produced in such a manner so that when a series of the forms are placed into a stack, such as in a tray that supplies forms to a printing station or a laser printer, there is no significant pad lean. That is, the stack of forms retains a relatively square, rectangular or cube shaped as opposed to one having a sloped configuration, a high end and a low end, due to differential thicknesses between the two portions of the construction. In addition, the form construction of the present invention enables the feeding of a form along the long side or in the landscape position and reduces the surface affinity between the forms.

3 Claims, 3 Drawing Sheets

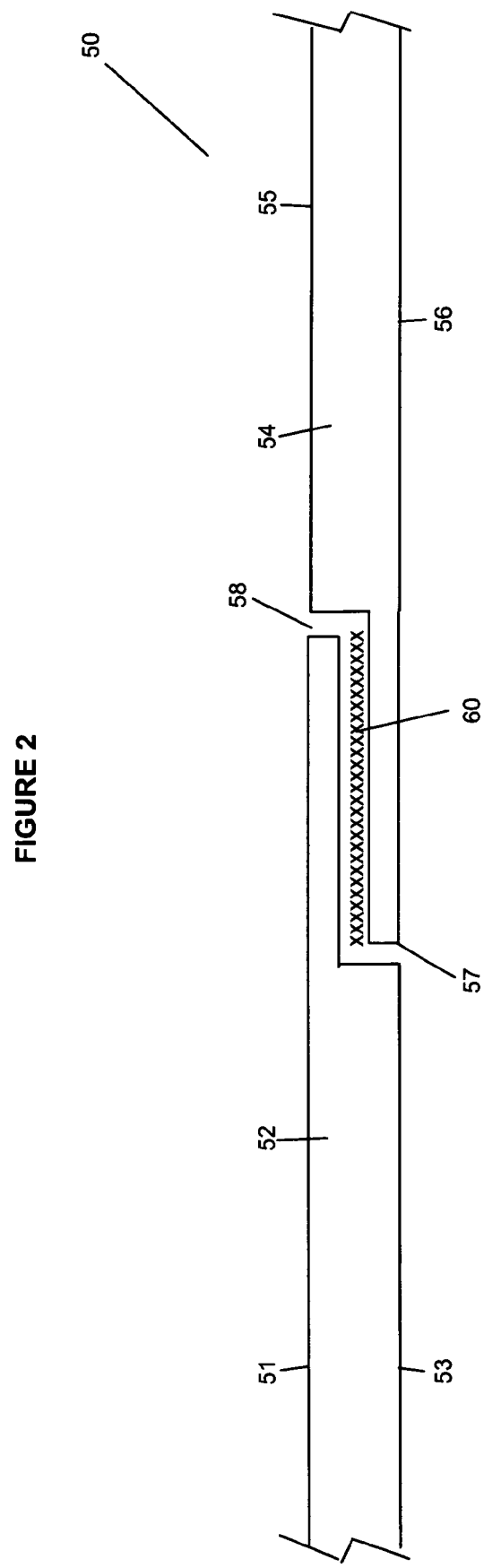

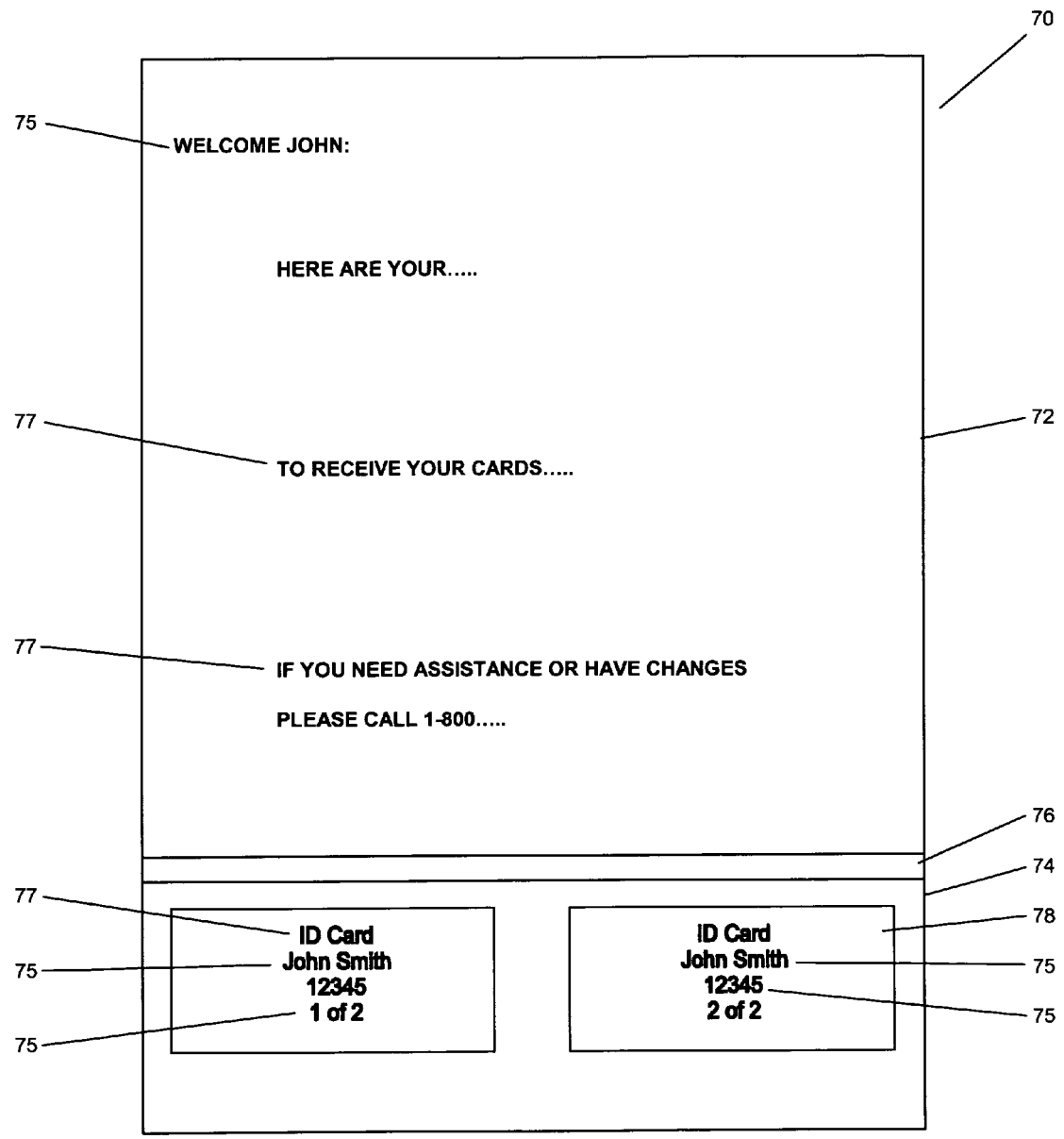

SUBSTANTIALLY PLANAR DISCONTINUOUS BUSINESS COMMUNICATION ASSEMBLY HAVING LASER ABRADED RECESSED AREAS

CROSS-REFERENCES TO RELATED APPLICATIONS

None.

FIELD OF THE INVENTION

The present invention relates to a substantially planar, discontinuous business form construction which is preferably created from differential substrates that have been provided with one or more removable elements such as cards, labels, tags and differential substrates. The form construction is desirably a composite form having at least first and second discrete portions or segments that are selected from different materials, one of which carries one or more removable elements and the other of which provides an information carrying portion. The form construction of the present invention is produced in such a manner so that when a series of the forms are placed into a stack, such as in a tray that supplies forms to a printing station or a laser printer, there is no significant pad lean arrangement. That is, the stack of forms retains a relatively square, rectangular or cube shaped as opposed to one having a sloped configuration, a high end and a low end, due to differential thicknesses between the two portions of the construction. In addition, the form construction of the present invention enables the feeding of a form along the long side or in the landscape position and reduces the surface affinity between the forms.

BACKGROUND OF THE INVENTION

Information carrying structures such as business forms with removable cards, tags and labels have long been used to convey information to the holder, presenter or recipient of the business form. When utilizing removable cards, such cards include but are not limited to insurance, medical, identification (ID cards), membership applications, admissions, tickets, collections, special events, credit or debit cards, temporary passes and the like.

One traditional means used to deliver cards was to place the card in a carrier that had cut out notches to receive two or more corners of the card and then deliver the card through the mail, by use of a courier or by such other means in order to place the card in the possession of the intended recipient. However, while effective in delivering the card to the end user, the process of assembling the mailing could be cumbersome, in that it required the carrier to be printed and then to subsequently cut notches in the carrier to create areas to hold the corners of the card and then, finally placing of the card in the carrier. Next, the carrier was typically folded and then usually placed in an envelope prior to mailing the card to the recipient. In addition to being a somewhat cumbersome manufacturing process, the process itself can be expensive, in that it requires a number of pieces, a supply of cards, carriers and envelopes. Thus, there has been a continuing trend to move away from such processes and reduce the number of separate components and steps required to prepare such a business form construction.

Another means by which to deliver cards that arose out of the need to reduce such processing complexities as discussed above was to simply affix the card to the top surface or uppermost portion of the sheet of paper or the like. This product configuration eliminated the need to die cut notches in the carrier to create an area to receive the card as well as the step of having to align and place the corners of the card within the cut out area of the carrier.

In this construction, where the card rides on top of the surface of the substrate, the card was normally affixed to the sheet of paper through the use of a spot adhesive that would hold the card in place during handling and transport, yet allow the card to be readily removed by the recipient. Alignment was not a critical concern and hence processing speeds improved. However, this construction, while eliminating some of the drawbacks associated with the above mentioned arrangement of putting a card into a carrier assembly, still suffered from unforeseen difficulties and created new problems in that the card was placed on the surface of the sheet of paper which then created a raised area that often resulted in jamming of the printer or feeding apparatus when attempting to image or process the paper substrate with the card attached. Unfortunately, while this particular construction resulted in manufacturing efficiencies, it also created difficulties for the end users as such product configurations had to be carefully or even gingerly fed through the printer, again slowing distribution to the end user and resulting in significant frustration of the end user or printer of the form construction.

In a still further effort to overcome the above-mentioned problem of differential thicknesses created by the inclusion of the card on the surface of the paper or substrate, manufacturers then sought to create holes, pockets or die cut areas in a substrate that corresponded in size and shape to the card that was to be placed into the receiving area. In such a construction, when the card was placed into a receiving area, the card would not rest above the level of the surface of the paper substrate, but instead may extend below the bottom surface of the sheet of paper. Once again the manufacturer, while solving the problem of having the card extend above the surface of the sheet, faced the problem of alignment and having to carefully position the card within the receiving area.

In addition to alignment, the manufacturer also had to hold and secure the card in the receiving area. As such, and in order to hold the card in place in the carrier, another web of material was affixed over the hole in the form of a patch, a continuous strip that ran edge to edge or segments of material that would hold the card in position, see for instance U.S. Pat. No. 5,403,236. While effective in-over coming the problem with the card being placed, on top of the substrate, such a construction then suffered from additional problems.

The addition of the supplemental material over the area of the cut out to receive the card again created a raised portion that extended either below the surface of the paper or alternatively both above and below the surface of the paper, depending upon the thickness of card structure. Again, the construction could still only be fed in a small amount to the printer as the area of double thickness around the card area created a hump, or a sloped configuration when several card carrying sheets were placed in a stack. This limited the amount of cards that could then be placed in the tray to be fed to the printer or processing equipment.

A still further solution to the above-mentioned dilemma was to create a calendared area or recess in the paper substrate, by crushing an area of the paper that corresponded to the size of the card. Then place the card within the substrate. This eliminated the need to apply a patch to hold the card in the area of a cut out into which a card would be inserted; however, this construction still suffers from other drawbacks. The thickness of the card material is still more than the thickness of the paper substrate. As such, the top surface of the card would still be above the top surface of the paper substrate leading to an arrangement that still suffered from difficulties in processing the card due to the differential thickness arising out of the card sticking out of the well or recessed area. In addition, the manufacturer still had to accurately align the construction so that it would fit within the area of the recess or well.

Calendaring of materials, particularly fibrous materials also suffers from another draw back, that of expansion due to humidity. The fibers in a calendared sheet or web are still present, they have merely been crushed, and when exposed to increased levels of humidity it is possible for the fibers to expand and thus, the benefit of calendaring is lost. For example, a manufacturing plant in Louisiana will likely have a higher degree of relative humidity when compared for example with a plant in Arizona. Thus, while a calendared construction may work in the Arizona plant due to the low humidity it may suffer from problems in the plant located in a higher humidity area.

Edge calendaring has also been used in certain circumstances such as shown in Holmberg U.S. Pat. Nos. 4,618,520 and 4,447,481 but such processes would again be subject to the difficulties of manufacturing environments.

The use of lasers to remove material from a sheet is generally known in the metal fabrication arts but heretofore, the inventors of the instant application were unaware of the use of lasers in the creation of business communication pieces and documents.

A still further business form and card construction was then contemplated to eliminate the need to align and place a card, usually plastic, in a well, recess, die cut area, etc. This solution was to simply affix a web of card material, again usually plastic, to the substrate. This enabled the manufacture to die cut the material directly in line with the imaging of the information carrying portion of the construction. However, such constructions while attractive from a manufacturing perspective also did not completely solve the processing of the form construction.

The web of card material still needed to be connected to the portion or web of information carrying material. In one arrangement, one web is affixed or partially juxtaposed directly onto an edge or side of the other portion by adhesive, crimping, mechanical fastening or the like. As expected however, this arrangement creates a bump in the form and contributes again to processing difficulties in attempting to feed the construction through the printer. Again, such arrangements had to be carefully processed through the printer and only a few forms at a time could be stacked into a feed tray for a printer or processing equipment.

An attempt to resolve the problem of the discontinuous surface area was to place the webs next to or adjacent one another and then place a small strip of material, such as tape to connect the two webs together. While this solved some additional problems for card manufacturers and end users, still other problems persisted. The area covered by the strip of tape creates a zone having a higher thickness than the rest of the configuration. This again creates problems of feeding the construction through the printer. In addition, the use of two different types of materials, the card material may also be thicker than the information portion of the substrate and as such when the products are placed into a stack they then again create a sloped arrangement, thus limiting the number of cards that can be placed in a feed tray for a printer.

A still further difficulty encountered by such two part constructions is that the web of card material, typically a plastic or synthetic film, may build up excess static when placed in a stack thus making feeding of the forms difficult as they tend to stick to one another in the tray or other feeding mechanism.

In addition to the foregoing enumerated drawbacks of these prior art constructions, modifications were also attempted with respect to the processing or printing equipment, more specifically to the feed trays in order to compensate for the pad lean or slope of the stack of products. Such modifications to the feed trays included the insertion of shims under one portion of the form structure, the form having the lesser thickness (that end without the card) in order to facilitate feeding of the forms. This modification led to more exotic configurations of feed trays including spring loaded and adjustable shims in order to accommodate differing types of form products. However, while the modifications to the equipment appeared to address the problem of pad lean, it nonetheless required the end user or printer to make sure that the appropriate tray, shim, or adjustment had been made to the equipment prior to beginning run of the product. In those situations where the operator forgot to make the equipment change then, the finishing process was subjected to further delays and jamming as indicated above. Moreover, many end users or printers were simply unwilling to make the additional investment in such modified trays.

An additional processing problem also resulted form the use of such prior art constructions. Such constructions, due to the difficulty in feeding the forms, required the forms to be fed in a portrait arrangement into the printer, that is in connection with a form size of 8½" by 11", the 8½" side was fed to printer first. By feeding the short side of the form into the printer first, the printer, which calculates wear of the print head based on the total running length of the print job, was subjected to additional wear in running a regular pass of product as opposed to being able to run a regular pass of forms when fed in a landscape, or long side first, arrangement through the printer. As can be expected, this also resulted in a further delay in processing the forms by the end user or printer.

What is needed therefore, is a business form card combination that overcomes the foregoing difficulties, such as pad lean or sloped stacks, static buildup and other problems so that larger numbers of cards can be placed in a feed tray as well as the problem of bumps or humps in the form construction is mitigated and the cost of manufacture is reduced so that the construction can be produced economically as well as expeditiously.

Publications, patents and patent applications are referred to throughout this disclosure. All references cited herein are hereby incorporated by reference.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Unexpectedly, it has been discovered that a substantially planar sheet for use as a business communication document could be created from discontinuous sheets of material by creating a recessed area through use of a laser in an edge or side portion of the sheets. The sheets may then be joined to one another either by applying a bonding material, such as a tape strip, in a channel area created when the recessed areas of the sheets are placed adjacent one another, or alternatively by creating recesses in the surfaces of the sheet that are opposite one another and then fitting the sheets together in an overlapping arrangement.

In one exemplary embodiment of the present invention, a substantially planar business communication substrate is described and includes a first substantially planar sheet of material that has first and second longitudinally extending sides, first and second transversely extending edges and first and second surfaces. The first planar sheet of material has a laser abraded recessed area which is created along one of the sides or the edges of the sheet.

A second substantially planar sheet of material is provided in connection with the presently described embodiment and has first and second longitudinally extending sides, first and second transversely extending edges and first and second surfaces. The second planar sheet of material has a laser abraded recessed area that is created along one of the sides or the edges of the sheet of material.

A bonding piece, such as a pattern of adhesive, strip of tape or other adhesive fastening means is provided and has first and second sides and an adhesive disposed on one of the first and second sides.

The recessed area of each of the first and second substantially planar sheets are placed adjacent one another such that the laser abraded recessed area of each of the sheets are in an abutting relationship to one another to create a channel. The bonding piece is placed within the channel with the adhesive side down to hold the sheets in a substantially planar configuration to one another.

In a still further exemplary embodiment of the present invention, a business form construction that is composed of two discontinuous segments is provided and includes a first segment that has a top face and a bottom face and an edge extending peripherally about the segment. A second segment that has a top face and a bottom face and an edge extending peripherally about the segment is also provided in connection with the presently described embodiment.

A first laser abraded recessed area is provided in the first segment in a portion of the edge on the top face and a second laser abraded recessed area is provided in the second segment in a portion of the edge on the bottom face. The first laser abraded recessed area of the first segment is positioned such that the second laser abraded recessed area of the second segment is disposed over the first area so that the top face of each of the first and second segments are in a substantially adjacent abutting relationship with one another.

In yet a still further embodiment of the present invention, business form intermediate assembly is described and includes a first portion that is selected from a first material. The first portion has first and second longitudinally extending sides, first and second transversely extending edges and top and bottom surfaces. The first portion also has a recessed area that is created by laser abrading a portion that is immediately adjacent the first transversely extending edge.

A second portion is provided and selected from a second material that is distinct from the first material. The second portion has first and second longitudinally extending sides, first and second transversely extending edges and top and bottom surfaces. The second portion has a recessed area that is created by laser abrading a portion of the material immediately adjacent one of the first and second transversely extending edges.

Continuing with the presently described embodiments, the first and second portions are aligned with one another such that the recessed area of the first portion is at least immediately adjacent the recessed area of the second portion so that a channel is created and is sized and configured to receive an adhesive bond for securing the first portion to the second portion.

In other related embodiments to those described above, the first sheet or segment of material is preferably selected from a cellulosic stock, such as paper and the second sheet of material is preferably a synthetic stock, selected from a group including polyethylene, polystyrene, polypropylene and combinations thereof.

In an exemplary construction, the first portion will be generally an information section that will preferably contain both static information and personalized or variable data that is related to the intended recipient of the business communication document or piece. Such an exemplary construction will typically be provided in an intermediate condition to a manufacturing location. That is, the business communication document will normally be largely blank, or may have some static or fixed information printed on the face of the document, such as company logo, instructions for removal of the card or other elements contained in the second portion of the assembly or construction.

These and other objects of the invention will become clear from an inspection of the detailed description of the invention and from the appended claims.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which:

FIG. 2 presents a further side elevation of the discontinuous sheets of the present invention, illustrating an alternative embodiment of the laser abraded portion of each of the sheets and connected to one another through the use of a pattern of adhesive; and FIG. 3 illustrates a front view of a completed business communication assembly prepared in accordance with the present invention.

DETAILED DESCRIPTION OF THE INVENTION

Figure 1:
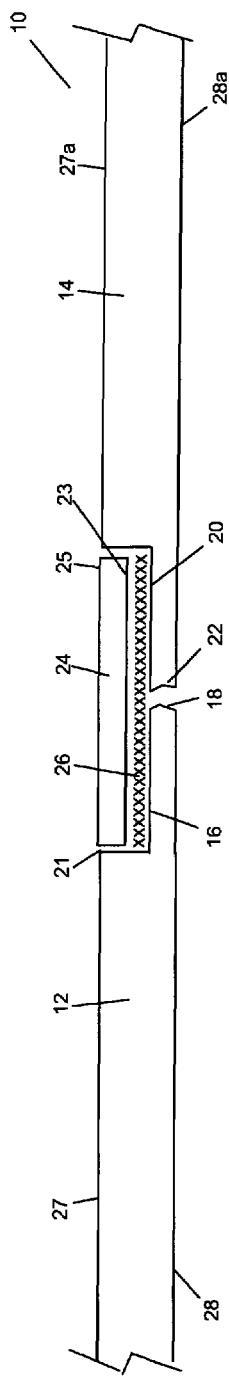
FIG. 1 depicts a side elevation of the discontinuous sheets of the present invention, illustrating the laser abraded portion of each of the sheets and connected to one another through the use of a tape strip.

The present invention is now illustrated in greater detail by way of the following detailed description which represents the best presently known mode of carrying out the invention. However, it should be understood that this description is not to be used to limit the present invention, but rather, is provided for the purpose of illustrating the general features of the invention.

The term "removable elements" refers to items such as cards, labels, chips, coins, tickets, tags and the like as well as portions of substrates that have a differential thickness compared with the remainder of the business form to which it is attached, connected or otherwise configured in arrangement therewith and may be removed from the form assembly.

As used herein the term "business communication piece or document" refers to a substrate that, either alone or in combination with other documents can convey a particular message, image or provide information about a particular product or service that is available from the provider of such pieces or documents. Business communication documents or pieces can include advertising, sales and marketing collateral and such other items used to convey information on written or imaged form sheets, brochures, presentation folders, informational sheets and combinations thereof.

The term "personalized information" refers to information that is printed or imaged onto a substrate, which is generally variable or unique and which may change from document to document or segment to segment, so as to create a customized message or communication for each recipient. Examples of personalized information may include names, addresses, descriptions, plans, coding, numbering, promotional text, etc. that may have been acquired from the intended recipient through surveys, questionnaires or answers given to various inquiries generated in response to a request for goods or services.

The term "static or fixed" information refers to printed or imaged information that generally does not change from document to document or segment to segment and may include a general description or body of information about particular products, services, places, etc. that may be of interest to the intended recipient and represents a standard message that the manufacturer or supplier wishes to convey to an end user or customer of the offering.

The term "intermediate" as used herein, refers to a product that undergoes one or more processing steps prior to the intermediate reaching a final condition, that of being ready for end use or application. The additional processing steps may include printing, imaging, folding, sealing, separating, cutting, perforating, scoring, adhering and the like. Typically, a product, such as with the present invention, is provided in an intermediate condition so that a user can add or manipulate the intermediate to create the final or desired end product. Thus, in accordance with the present invention, the intermediate segment, for example, could be subject to die cutting or additional printing, such as through ink jetting, over laminating, coating or embossment.

The term "sheets" or "segments" as used herein, refers to sheets, segments, ribbons, strips, pieces, parts, sections, subdivisions and combinations thereof. The sheet or segment provided as an example for the purposes of this specification can be an entire sheet such as 8½"×11", 11"×14", 19"×25" portions of sheets and other known sheet sizes or may be segments, divisions, strips, etc. of such sheets.

It should be understood that the type, shape, number and arrangement of the removable elements is discretionary and any such configuration may be used depending on the needs of the end user or particular application for which the removable elements are intended. As indicated in the FIGURES a side by side arrangement of two cards is provided, or the cards may be a self-laminating construction. The cards or removable elements may be disposed one on top of the other or only a single element may be present. While the card is generally considered to be a "wallet sized" card, one about the standard dimensions of a credit card, the card could also be larger such as to form an informational placard or alternatively could be much smaller such as useful in connection with a key tag or the like.

The term "patterns" as used herein refers to continuous strips, sheets, lines, shapes, spots or elements, discontinuous segments, spots, shapes or elements as well as regular and irregular placement of such items. Patterns may also refer to combinations of the above mentioned items such that one pattern may be a continuous strip, another segmented elements and still further an irregular placement of dots or the like. Any combination of patterns is possible depending on the need or application of the manufacturer or the end user. In addition, the pattern can be prepared in order to accommodate a particular theme, season, event, trade dress, and the like.

The patterns may be formed from strips, segments, dots or geometric elements of material. It is also desirable that the material and coating are selected so that they reduce surface affinity between the sheets, thereby enabling the sheets to release from the stack readily and facilitate the feeding and handling of the sheets by the printer or processing device.

The adhering or bonding material that is used to secure the substrates together which may be applied by flood coating, pattern or spot coating, transfer coating or other means known in the industry. The material may be the full length and width of the substrates or may be applied so that the edges of the material extend slightly beyond the pattern of the material laid down. The material used in this invention, refers to tape, adhesive, bonding agents and the like that can be applied to the substrates and used to hold the substrates to one another.

An exemplary tape that may be used in connection with the present invention to bond the webs, sheets or substrates together is an acrylic high performance tape available from Polybond, Corporation of Derry, N.H. and under the product number #114 PET tape. The tape is a polyester (PET) based material to which an acrylic adhesive has been applied. In order to reduce adhesive contamination, the tape is desirably cut using release coated blades on the slitter or other cutting mechanisms. Such release coating includes silicone, Teflon® and the like.

An exemplary coating that can be applied over the surface of the bonding material that is suitable for use in connection with the present invention is Sericol® which is available from Sericol of North Kansas City, Kans. and includes acrylate ester, vinaly monomer, acrylated urethane, alkanol amine, barium sulfate and a photoinitator. Sericol® is a pigment less material having an absorbing agent contained therein as well as being in a prescribed pH range. Exemplary Sericol® blends include IJR-701-1 "white" and IJR-751-1 "matt clear."

The securing or bonding material is over coated with the Sericol® through the use of a blade applicator, Meyer rod, anilox roll or other suitable coating means understood by those skilled in the art. The thickness of the coating ranges from about 0.0001 mil to about 10 mils with about 0.5 to about 1.5 mils being more preferred and about 0.9 to about 1.2 mils being yet still more preferred.

The coating of the present invention is applied generally without dilution but may be diluted such with the inclusion of water. A pH stabilizer and drying/wetting agent may also be added to enhance performance characteristics. Where additives are provided, the range of such additives ranges from about 0.01% to about 20% by weight with the amount of Sericol® ranging from approximately 99.99% to about 80% by weight.

The coating of the present invention is UV curable. UV curing is a technology that regularly evolves and efforts are continually sought out in order to achieve improved curing performance so that the printing operation may proceed at optimum speeds. That is, UV curing typically requires a "dwell time" in which the UV curable substance dries before it can be further processed in any additional equipment. As such, it is preferable to achieve faster curing speeds under a variety of difficult and complex environments so as to minimize if not completely eliminate the need for dwell or drying time.

Exemplary bulbs used in curing the slurry of the present invention are "H" bulbs and Gallium doped bulb suitable for use in the UV curing processes described herein, however, it should be understood that other UV curing may be used in accordance with the present invention and the present invention is not limited hereto.

The "H" bulb is generally known as a mercury vapor bulb and is used typically for top surface curing applications. The Gallium doped bulb is used in connection with a requirement for penetrating deep within the slurry mix. The UV bulbs such as those described above along with reflectors are available from the GEW Company, located in North Royalton, Ohio. The combination of topical and penetration curing result in a combination of curing energies sufficient to carry out the present invention.

Turning now to a discussion of FIG. 1 of the present invention a side elevation is provided which depicts the business communication document 10 of the present invention. The document includes a first segment or sheet 12, which preferably will be selected from a cellulosic material, such as paper, card or board stock. A second sheet 14 is also provided and preferably is selected from a distinct material, such as a synthetic stock selected from a group including polyethylene, polypropylene, polystyrene or combinations thereof. It should, however, be understood that the first sheet may be synthetic and the second cellulosic or both constructed from substantially similar materials.

FIG. 1 further shows a first recessed area 16 on the first sheet 12 which has been provided adjacent a peripheral edge 18 of the first sheet 12. The construction 10 includes a second recessed area 20 that has been provided adjacent a peripheral edge 22 of the second sheet 14. By placing the sheets 12 and 14 immediately adjacent one another a channel 21 is created by having recessed areas 16 and 20 next to each other. The recessed areas 16 and 20 will preferably run the length of side or end edge and will extend inwardly from the edge a distance of up to one inch, preferably less such as a half of an inch or a quarter of an inch. The distance will be dependent on the type of bonding material that may be used to hold the assembly together of the bond strength necessary to retain the sheets in the configuration.

The depth of the recessed area will preferably be no more than about half of the thickness of the sheet and typically the depth will be such that when the bonding material (tape or adhesive) is placed in the recessed area, the top of the bonding material will be substantially flush with the surface of the sheet so as to create a substantially planar configuration that will not interfere with the processing (e.g. printing) of the assembly in the user location.

A strip of tape 24 having a top surface 25 and bottom surface 23 is provided and a pattern of adhesive 26 is applied to the bottom surface 23, such that when the tape 24 is placed into the channel 21, the tape will serve to secure the segments together.

As can be seen from FIG. 1, each of the sheets has a top face 27 and 27A and a bottom face 28 and 28a and in this particular configuration, it can be seen that a portion of the top face or surface 27 and 27A of each of sheets 12 and 14 has been removed to create adjacent recessed areas when the sheets are disposed next to one another.

Figure 1A:
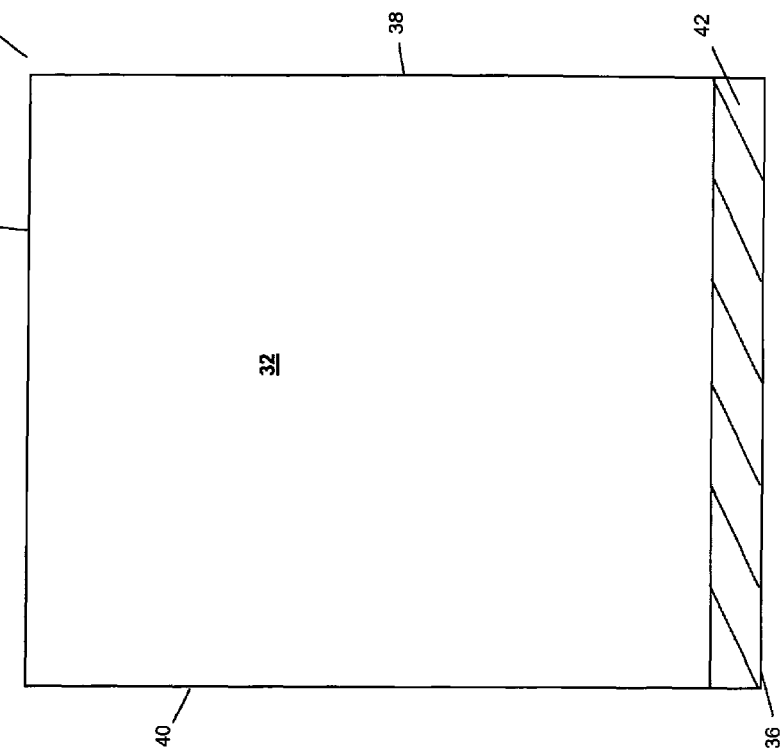
FIG. 1A shows a front view of one of the sheets used in preparing the business communication document of the present invention.

Attention is now directed to FIG. 1A which shows a front view of an exemplary sheet used in construction of the business assembly of the present invention. For simplicity of explanation, only a single sheet will be described, but it should be understood that the sheet is intended to be representative of two sheets that are used in the construction of the present invention.

The sheet 30, which is generally quadrate in its depiction, is provided with a top face 32 and bottom face (not shown in the current FIG. 1A but visible in FIG. 1), first and second transversely extending edges 34 and 36 and first and second longitudinally extending sides 38 and 40. Adjacent a first end edge 36 a recessed area 42 has been created by abrading a portion of the sheet material through the use of a laser abrading system available from ABG International, Bridlington, East Yorkshire England. The depth and width of the abraded portion 42 will again be dependent upon the width and thickness of the bonding material and will generally be determined in advance of abrading the material from the surface of the sheet.

Reference is now directed to FIG. 2 which shows an alternate configuration of a side view of the business communication assembly 50 of the present invention. The assembly 50 includes first and second sheets 52 and 54. The first sheet 52 has a top surface 51 and bottom surface 53 and the second sheet has a top surface 55 and bottom surface 56. The first sheet 52 has been provided with a recessed area that is adjacent an end edge 58 and the recess has been cut from the bottom surface 53. The second sheet 54 has likewise been provided with a recessed area that is adjacent an end edge 57 that has been cut from the top surface 55. Each of the recessed areas in each of the sheets has been prepared by abrading a surface by a laser to remove a portion of the material from each of the sheets.

As shown, the sheets 52 and 54 are placed together such that the recessed areas of each of the sheets overlap one another. In between the recessed areas a bonding agent 60, such as a pressure sensitive adhesive is placed to bind the sheets to one another. In this configuration, a substantially planar arrangement is obtained through the use of a tongue and groove type mechanism.

FIG. 3 shows an exemplary business communication document 70 prepared in accordance with the present invention. The document includes a first sheet 72 and second sheet 74 that are bound through the use of a binding arrangement 76 as has been described herein. Each of the first and second sheets 72 and 74 are provided with personalized indicia represented by numeral 75 and static or fixed indicia that is represented by numeral 77. In this way, the intermediate assembly could be pre-printed with static or fixed information 77 by the business form manufacturer and then the variable or personalized information may be added by the user of the form, such as an insurance company or health care provider who may add names, account numbers and the like. The back or bottom surface (not shown) may also be printed with information, both fixed and variable as will be understood by those in the printing industry.

The second sheet 74 is also provided with one or more removable elements 78 that will generally be removed by the end user upon receipt of the business communication document. In the present FIG. 3, the removable elements take the shape of cards, such as membership cards that may be removed and placed in a wallet or the like. In addition to cards, the document may contain other types of removable elements such as chips, tags, tokens, labels, coins, discs, etc.

It should be understood that while the form may be prepared in connection with the representation provided in FIG. 3, the assembly of the present invention can be prepared in many other arrangements or layouts. For example, while generally quadrate sheets have been used to form the assembly depicted, various shaped items can be joined to one another to create business communication pieces. The shapes not need to be solely geometric, but may also be animate, inanimate or combinations thereof.

It will thus be seen according to the present invention a highly advantageous business communication substrate having one or more removable elements has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

The invention claimed is:

1. A substantially planar business communication substrate, comprising:
   a) a first substantially planar sheet substantially coplanar with said first sheet, said second sheet being of material having first and second longitudinally extending sides, first and second transversely extending edges and first and second surfaces, and said second planar sheet of material having a laser abraded recessed area created along one of said sides or said edges;
   b) a second substantially planar sheet of material having first and second longitudinally extending sides, first and second transversely extending edges and first and second surfaces, and said second planar sheet of material having a laser abraded recessed area created along one of said sides or said edges; and
   c) a bonding piece, having first and second sides and an adhesive disposed thereon;
   d) wherein said recessed area of each of said first and second substantially planar sheets are placed adjacent one another such that said laser abraded recessed areas of said sheets are in an overlying relationship to one another to create a channel and said bonding piece is placed within said channel, to hold said sheets in a substantially planar configuration to one another.

2. A business form construction composed of two substantially coplanar discontinuous segments, comprising:
   a) a first segment having a top face and a bottom face and an edge extending peripherally about said segment;
   b) a second substantially coplanar segment having a top face and a bottom face and an edge extending peripherally about said segment;
   c) a first laser abraded recessed area provided in said first segment in a portion of said edge on said top face; and
   d) a second laser abraded recessed area provided in said second segment in a portion of said edge on said bottom face;
   e) wherein said first laser abraded recessed area of said first segment is positioned such that said second laser abraded recessed area of said second segment is disposed over said first area such that said top face of each of said first and second segments are in a substantially adjacent overlying relationship with one another.

3. A business form intermediate assembly, comprising:
   a) a first portion selected from a first material and having first and second longitudinally extending sides, first and second transversely extending edges and top and bottom surfaces, said first portion having a recessed area created by laser abrading immediately adjacent said first transversely extending edge; and
   b) a second portion selected from a second material distinct from said first material and having first and second longitudinally extending sides, first and second transversely extending edges and top and bottom surfaces, said second portion having a recessed area created by laser abrading immediately adjacent one of said first and second transversely extending edges;
   c) wherein said first and second portions are aligned with one another such that said recessed area of said first portion is at least immediately adjacent said recessed area of said second portion so that a channel is created and is sized and configured to receive an adhesive bond for securing said first portion to said second portion.

* * * * *